(12) United States Patent
Yoon

(10) Patent No.: US 10,302,848 B2
(45) Date of Patent: May 28, 2019

(54) CURVED DISPLAY DEVICE

(71) Applicant: Samsung Display Co., Ltd., Yongin-Si, Gyeonggi-Do (KR)

(72) Inventor: Sanghyuck Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 98 days.

(21) Appl. No.: 15/048,001

(22) Filed: Feb. 19, 2016

(65) Prior Publication Data

US 2016/0306102 A1 Oct. 20, 2016

(30) Foreign Application Priority Data

Apr. 16, 2015 (KR) ........................ 10-2015-0053963

(51) Int. Cl.
*F21V 8/00* (2006.01)
*G02F 1/1333* (2006.01)

(52) U.S. Cl.
CPC ............ *G02B 6/0083* (2013.01); *G02B 6/009* (2013.01); *G02B 6/0055* (2013.01); *G02B 6/0068* (2013.01); *G02B 6/0073* (2013.01); *G02F 1/133308* (2013.01)

(58) Field of Classification Search
CPC ............ F21Y 2103/10; F21Y 2105/10; F21Y 2115/10; G02B 6/0011; G02B 6/0031; G02B 6/0055; G02B 6/0068; G02B 6/0073; G02B 6/0083; G02B 6/0088; G02B 6/0091; G02B 6/0081; G02B 6/0093; G02B 6/0013; G02B 6/0023; G02B 6/0085; G02B 6/009; G02F 1/133305; G02F 2001/133314; G02F 1/133615; G02F 1/133308; G02F 2001/13332; G02F 2001/133317; G09F 9/301; G09F 9/35

See application file for complete search history.

(56) References Cited

U.S. PATENT DOCUMENTS

| 8,958,022 | B2 * | 2/2015 | Youk | G02B 6/0083 |
| | | | | 349/161 |
| 9,274,362 | B2 * | 3/2016 | Hsiao | G02F 1/133308 |
| 9,322,980 | B2 * | 4/2016 | Kamada | G02F 1/133512 |
| 9,470,920 | B2 * | 10/2016 | Hsiao | G02F 1/133308 |
| 2009/0310339 | A1 * | 12/2009 | Jung | G02F 1/133603 |
| | | | | 362/97.3 |

(Continued)

FOREIGN PATENT DOCUMENTS

| KR | 1020140057935 A | 5/2014 |
| KR | 10-1420521 B1 | 7/2014 |
| KR | 10-1432899 B1 | 8/2014 |

*Primary Examiner* — Hargobind S Sawhney
(74) *Attorney, Agent, or Firm* — Cantor Colburn LLP

(57) ABSTRACT

A curved display device includes a display panel which displays images using a light, the display panel curved along a first direction, a backlight unit which generates and provides the light to the display panel, and an accommodating member including a bottom portion and sidewalls which extend from the bottom portion to define a space in which the backlight unit is disposed. The backlight unit includes a plurality of light sources which generates and emits the light, and a circuit pattern film including a circuit pattern which electrically connects the light sources to each other. The circuit pattern film is attached to a first sidewall among the sidewalls of the accommodating member.

6 Claims, 6 Drawing Sheets

(56) References Cited

U.S. PATENT DOCUMENTS

| | | | | |
|---|---|---|---|---|
| 2010/0073905 | A1* | 3/2010 | Hsin-Nung | G02B 6/0083 362/97.1 |
| 2011/0032450 | A1* | 2/2011 | Shigeta | G02B 6/0018 349/61 |
| 2011/0090426 | A1* | 4/2011 | Choi | G02B 6/009 349/65 |
| 2011/0096262 | A1* | 4/2011 | Kikuchi | G09F 9/301 349/58 |
| 2013/0141652 | A1* | 6/2013 | Kuromizu | G02B 6/0083 348/790 |
| 2013/0258251 | A1* | 10/2013 | Lee | H05K 1/0209 349/69 |
| 2014/0125913 | A1* | 5/2014 | Lee | G02F 1/133615 349/58 |
| 2015/0160407 | A1* | 6/2015 | Hsiao | G02F 1/133308 349/65 |
| 2015/0219940 | A1* | 8/2015 | Kim | G02F 1/1336 362/612 |

* cited by examiner

CURVED DISPLAY DEVICE

This application claims priority to Korean Patent Application No. 10-2015-0053963, filed on Apr. 16, 2015, and all the benefits accruing therefrom under 35 U.S.C. § 119, the contents of which are hereby incorporated by reference in its entirety.

BACKGROUND

1. Field

The invention relates to a curved display device. More particularly, the invention relates to a curved display device having a light source integrated member.

2. Description of the Related Art

In general, a light emitting diode ("LED") has been widely adopted as a light source for a liquid crystal display ("LCD"), e.g., LCD television ("LCD-TV"), LCD display monitor, etc., as well as in various lighting devices, instead of a fluorescent lamp due to advantages such as, low power consumption, semi-permanent lifespan, high brightness, etc. thereof.

For instance, for an edge-illumination type LCD in which the LED is disposed at an edge of a display panel, a frame generally includes a bottom chassis, a top chassis and a middle mold, and LEDs are disposed at the edge of the bottom chassis such as after being attached onto an LED bar which electrically connects the LEDs to each other. In particular, a separate member referred to as an extrusion bar, is assembled with the edge of the bottom chassis, and then the LED bar with LEDs thereon is coupled to the separate extrusion bar.

The above-described structure of the extrusion bar and the LED bar is similarly applied to the lighting devices, e.g., an LED lamp employing the LED as a light source thereof.

SUMMARY

One or more exemplary embodiment of the invention provides a curved display device in which a light source is mounted on an accommodating member or a supporting member to reduce a manufacturing cost thereof.

Exemplary embodiments of the invention provide a curved display device including a display panel which displays an image using a light, the display panel curved along a first direction, a backlight unit which generates and provides the light to the display panel, and an accommodating member including a bottom portion and sidewalls which extend from the bottom portion to define a space in which the backlight unit is disposed. The backlight unit includes a plurality of light sources which generate and emit the light, and a circuit pattern film including a circuit pattern which electrically connects the light sources to each other. The circuit pattern film is attached to a sidewall among the sidewalls of the accommodating member.

Exemplary embodiments of the invention provide a curved display device including a display panel which displays an image using a light, the display panel curved along a first direction, a backlight unit which generates and provides the light to the display panel, an accommodating member including a bottom portion and sidewalls which extend from the bottom portion to define a space in which the backlight unit is disposed, and a supporting member coupled to a sidewall among the sidewalls of the accommodating member. The backlight unit includes a plurality of light sources which generates and emits the light, and a circuit pattern film including a circuit pattern which electrically connects the light sources to each other. The circuit pattern film is attached to one sidewall of the accommodating member.

According to one or more exemplary embodiment, since a circuit pattern which connects the light sources to each other is directly mounted on a curved member (e.g., the supporting member or the accommodating member having the curved shape), separate light source circuit boards which connect light sources to each other are obviated. Since separate light source circuit boards which connect light sources to each other are omitted in the curved display device, a manufacturing cost of the curved display device may be reduced when compared to a case where separate flat shape light source circuit boards for connecting light sources to each other are separately mounted on a curved member (e.g., the supporting member or the accommodating member) having the curved shape.

Furthermore, since a connector which provides power to the light sources is electrically connected to circuit pattern which is directly mounted on a curved member (e.g., the supporting member or the accommodating member having the curved shape), a manufacturing process required to electrically connect the circuit pattern to a power source may be simplified.

In addition, according to one or more exemplary embodiment, since the circuit board having the film shape is employed to attach the light sources within the curved display device, stress to a separate flat-shape light source circuit board separately mounted on a curved member caused by the curved shape of the curved display device may be reduced.

BRIEF DESCRIPTION OF THE DRAWINGS

The above and other advantages of the disclosure will become readily apparent by reference to the following detailed description when considered in conjunction with the accompanying drawings, in which.

DETAILED DESCRIPTION

Figure 1:
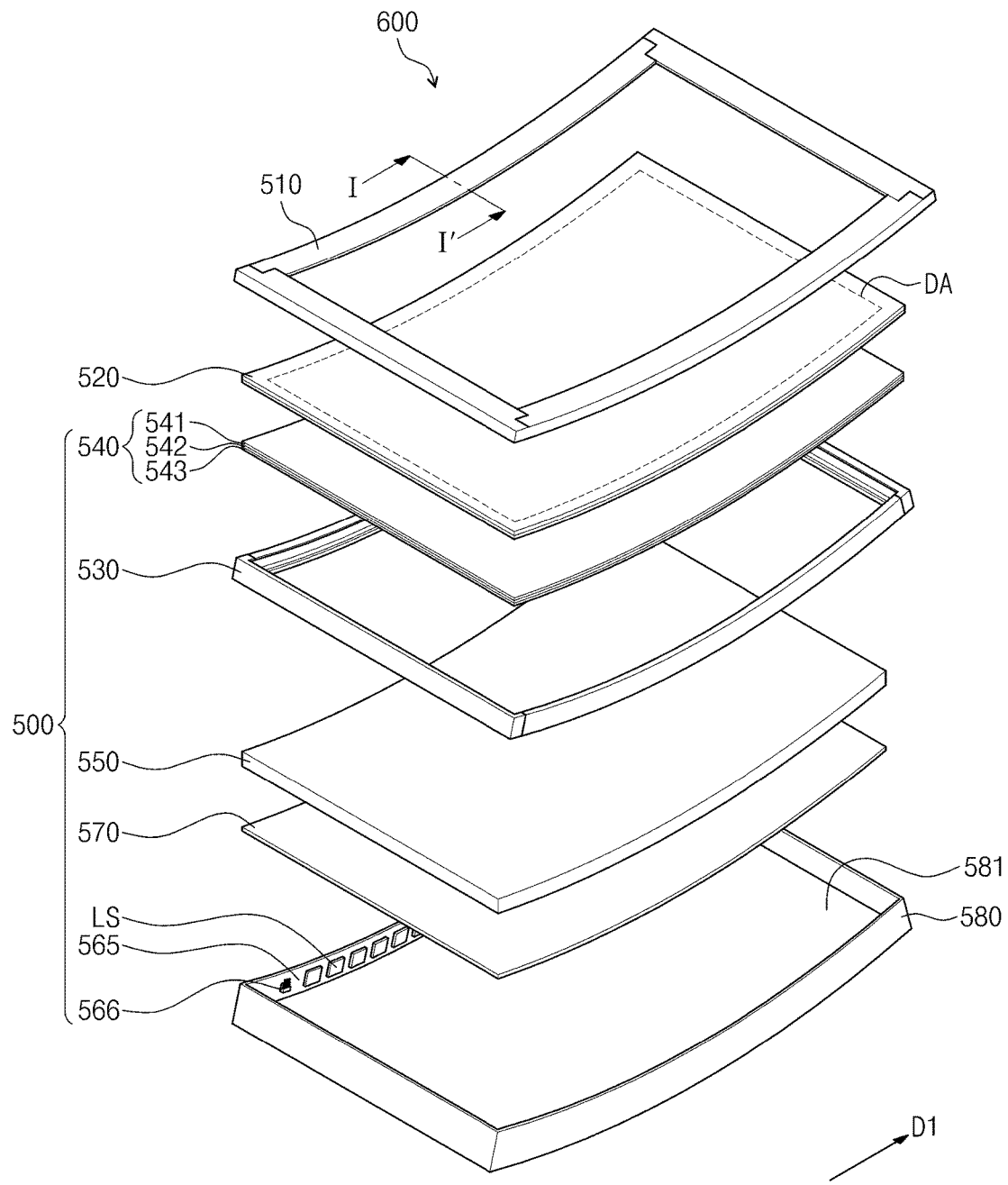
FIG. 1 is an exploded perspective view showing an exemplary embodiment of a curved display device according to the invention.

The following description with reference to the accompanying drawings is provided to assist in a comprehensive understanding of various exemplary embodiments of the invention as defined by the claims and their equivalents. It includes various specific details to assist in that understanding but these are to be regarded as merely exemplary. Accordingly, those of ordinary skill the art will recognize that various changes and modifications of the various exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of various exemplary embodiments of the invention is provided for illustration purpose only and not for the purpose of limiting the present disclosure as defined by the appended claims and their equivalents. Like reference numerals refer to like elements throughout.

It will be understood that when an element is referred to as being "on" or "connected to" another element, it can be directly on the other element or intervening elements may be present therebetween. In contrast, when an element is referred to as being "directly on" or "directly connected to" another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A light emitting diode ("LED") bar which electrically connects light sources to each other may include an element such as a printed circuit board. In a conventional display device, attaching the LED bar to a separate extrusion bar increases both a number of parts of the display device and a number of processes in manufacturing the display device, each of which undesirably increases manufacturing costs and time.

For instance, for a conventional curved display device, where a conventional light source circuit board (e.g., LED bar) with light sources thereon has a flat shape and the flat-shape light source circuit board is mounted on a curved member of the curved display device, both a number of parts of the display device and a number of processes in manufacturing the curved display device are increased which undesirably increases manufacturing costs and time. Furthermore, where the flat-shape light source circuit board having a relative large thickness and rigidity is mounted on a curved member of the curved display device, a force applied to the flat-shape light source circuit board from the curved shape of the curved member of the display device may cause stress in a conductive layer of the circuit board which connects light sources to each other.

Hereinafter, exemplary embodiments of the invention will be explained in detail with reference to the accompanying drawings.

Figure 2:
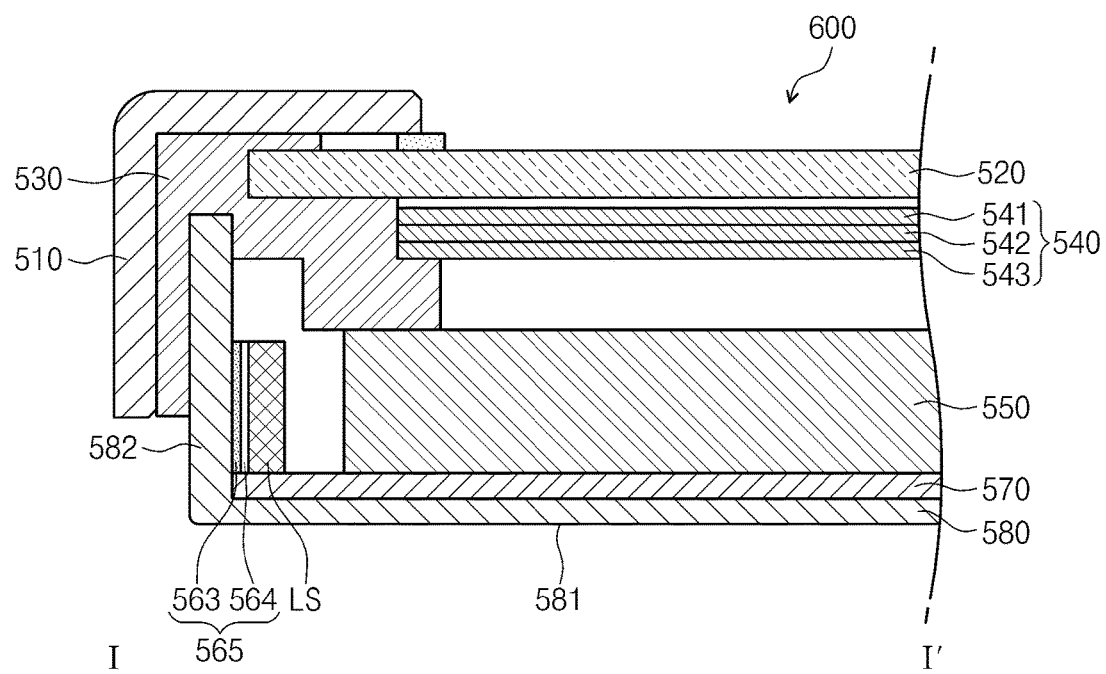
FIG. 2 is a cross-sectional view taken along line I-I' of FIG. 1.

FIG. 1 is an exploded perspective view showing an exemplary embodiment of a curved display device 600 according to the invention and FIG. 2 is a cross-sectional view taken along line I-I' of FIG. 1.

Referring to FIGS. 1 and 2, the curved display device 600 is curved along a first direction D1 and has a curved shape. The curved display device 600 includes a display panel 520, a backlight unit 500, an accommodating member 580 and a covering member 510.

In the exemplary embodiment, the display panel 520 may be, but not limited to, a liquid crystal display panel. The liquid crystal display panel may include a first display substrate (not shown) and a second display substrate (not shown) facing the first display substrate.

When the display panel 520 has the curved shape, a display area DA of the display panel 520 in which an image is displayed, has a curved surface shape curved along the first direction D1. Thus, the curved display device 600 displays an image having improved three-dimensional effect, sense of immersion (or immersiveness), and presence owing to the display area DA having the curved surface shape.

The backlight unit 500 includes a plurality of light sources LS, a reflection plate 570, a light guide plate 550, a mold frame 530, a plurality of optical sheets 540, a circuit pattern film 565 and a connector 566.

Each of the light sources LS generates and emits a light. In the exemplary embodiment, each of the light sources LS is mounted on a first sidewall 582 among plural sidewalls of the accommodating member 580 and is disposed adjacent to a side portion of the light guide plate 550. Accordingly, the light emitted from the light sources LS is incident to the light guide plate 550 at the side portion thereof. In the exemplary embodiment, each of the light sources LS includes a light emitting diode, but the invention is not limited thereto.

The reflection plate 570 includes a light reflecting material, such as polyethylene terephthalate ("PET"), aluminum, etc., and is disposed on a bottom portion 581 of the accommodating member 580. The bottom portion 581 and the sidewalls of the accommodating member 580 may define a receiving space of the accommodating member 580.

The light guide plate 550 is accommodated in the accommodating member 580 and is disposed on the reflection plate 570 to guide the light provided from the light sources LS to the display panel 520.

The mold frame 530 is coupled to the accommodating member 580. In more detail, portions of the mold frame 530 extend along the sidewalls of the accommodating member 580 and are coupled to the sidewalls. In addition, the mold frame 530 fixes edges of the light guide plate 550 accommodated in the accommodating member 580 to the bottom portion 581 of the accommodating member 580. The optical sheets 540 and the display panel 520 are sequentially disposed on the mold frame 530.

The optical sheets 540 are disposed between the display panel 520 and the light guide plate 550. In the exemplary embodiment, the optical sheets 540 include a diffusion sheet 543 which diffuses the light from the light guide plate 550, a prism sheet 542 which condenses the light, and a protection sheet 541 which protects a rear surface of the display panel 520.

The prism sheet 542 condenses the light diffused by the diffusion sheet 543 to a direction substantially perpendicular to a plane surface of the display panel 520. Thus, the condensed light travels in a vertical direction owing to the prism sheet 542 after passing through the prism sheet 542, and as a result, a front brightness of the curved display device 600 is improved by the prism sheet 542.

The covering member 510 is disposed on the display panel 520 to cover a portion the display panel 520, the backlight unit 500 and the accommodating member 580.

The circuit pattern film 565 is attached to the first sidewall 582 of the accommodating member 580 and is electrically connected to the light sources LS, and thus the light sources LS may emit the light with electrical power and/or signals provided by the circuit pattern film 565.

The connector 566 is mounted on the first sidewall 582 of the accommodating member 580 together with the circuit pattern film 565 and is electrically connected to the circuit pattern film 565. Thus, the light sources LS may emit the light with electrical power and/or signals provided by the connector 566 through the circuit pattern film 565.

The accommodating member 580 accommodates the backlight unit 500 therein. The accommodating member 580 includes the bottom portion 581 and the sidewalls which extend from the bottom portion 581 to accommodate the backlight unit 500 therein. The light sources LS may be arranged on one or more sidewall among the sidewalls of the accommodating member 580. Details on the above will be described with reference to FIG. 3.

The covering member 510 defines an opening therein to correspond to the display area DA and covers edges of the display panel 520. Thus, in a top plan view of the curved display device 600, the edges of the display panel 520 are covered by the covering member 510 and the display area DA is exposed to outside the display panel 520 at front (viewing) side of the curved display device 600.

Figure 3:
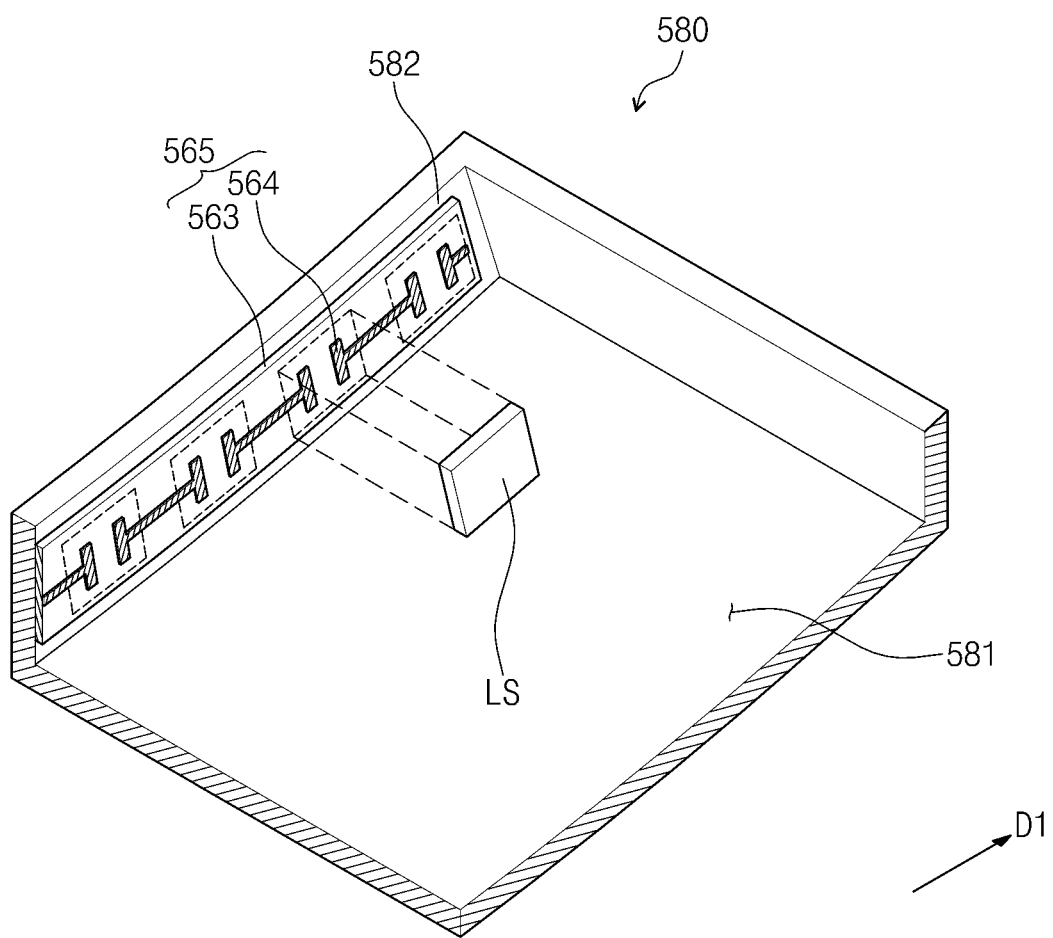
FIG. 3 is a perspective view showing an exemplary embodiment of a coupling state between light sources and sidewalls of an accommodating member shown in FIG. 1.

FIG. 3 is a perspective view showing an exemplary embodiment of a coupling state between light sources and sidewalls of an accommodating member shown in FIG. 1.

Referring to FIG. 3, the accommodating member 580, which is curved along the first direction D1, includes the bottom portion 581 and the first sidewall 582. Both the bottom portion 581 and the first sidewall 582 may be curved along the first direction D1. In the exemplary embodiment, the circuit pattern film 565 is attached to the first sidewall 582 which extends from the bottom portion 581, and the light sources LS are arranged on the circuit pattern film 565. The light sources LS are arranged along a length of the circuit pattern film 565 in the first direction D1.

The circuit pattern film 565 includes an insulating layer 563 and a circuit pattern 564. The insulating layer 563, on which the circuit pattern 564 is disposed, is attached to the first sidewall 582. Attachment of the circuit pattern film 565 within the accommodating member 580 fixes a position of the circuit pattern film 565 within the accommodating member 580. The insulating layer 563 has a film shape. As used herein, a film or a film shape of a member indicates that a thickness of the member is substantially small with respect to a planar area thereof. The film or film shape member may be relatively flexible so as to reduce stress of components disposed thereon when the film or film shape is deformed or curved. Although not shown in figures, electrodes including a conductive layer are disposed on a rear surface of the light sources LS, and the electrodes of the light sources LS contact the circuit pattern 564 to electrically connect the light sources LS to the circuit pattern 564. Referring the dotted outline in FIG. 3, one light source LS may overlap two circuit patterns 564, and two adjacent light sources LS disposed in this manner would then be connected in series by a circuit pattern 564 overlapped by the two adjacent light sources LS. The circuit pattern 564 is illustrated as a collection of discrete conductive patterns, but the invention is not limited thereto.

Two light sources LS disposed adjacent to each other among the light sources LS arranged along the circuit pattern film 565 are electrically connected to each other by the circuit pattern 564. In more detail, among the two adjacent light sources LS, an electrode of one light source LS and an electrode of the other light source LS are electrically connected to each other by the circuit pattern 564, and thus the two adjacent light sources LD are electrically connected to each other in series. The above-described electrical connection is the same for adjacent pairs of light sources LS among the light sources LS arranged along the circuit pattern film 565 to electrically connect the light sources LS arranged along the circuit pattern film 565 to each other in series by the circuit pattern 564.

According to the exemplary embodiment, since the circuit pattern film 565 is attached to the sidewall 582 of the accommodating member 580 and the light sources LS are arranged on the circuit pattern film 565, a separate printed circuit board on which are mounted the light sources LS may be omitted.

Also, since a position of the circuit pattern film 565 is fixed within the accommodating member 580, where the light sources LS are mounted on the sidewall 582 and the circuit pattern film 565 is interposed between the sidewall 582 and the light sources LS, the light sources LS are more stably arranged within the accommodating member 580.

Figure 4:
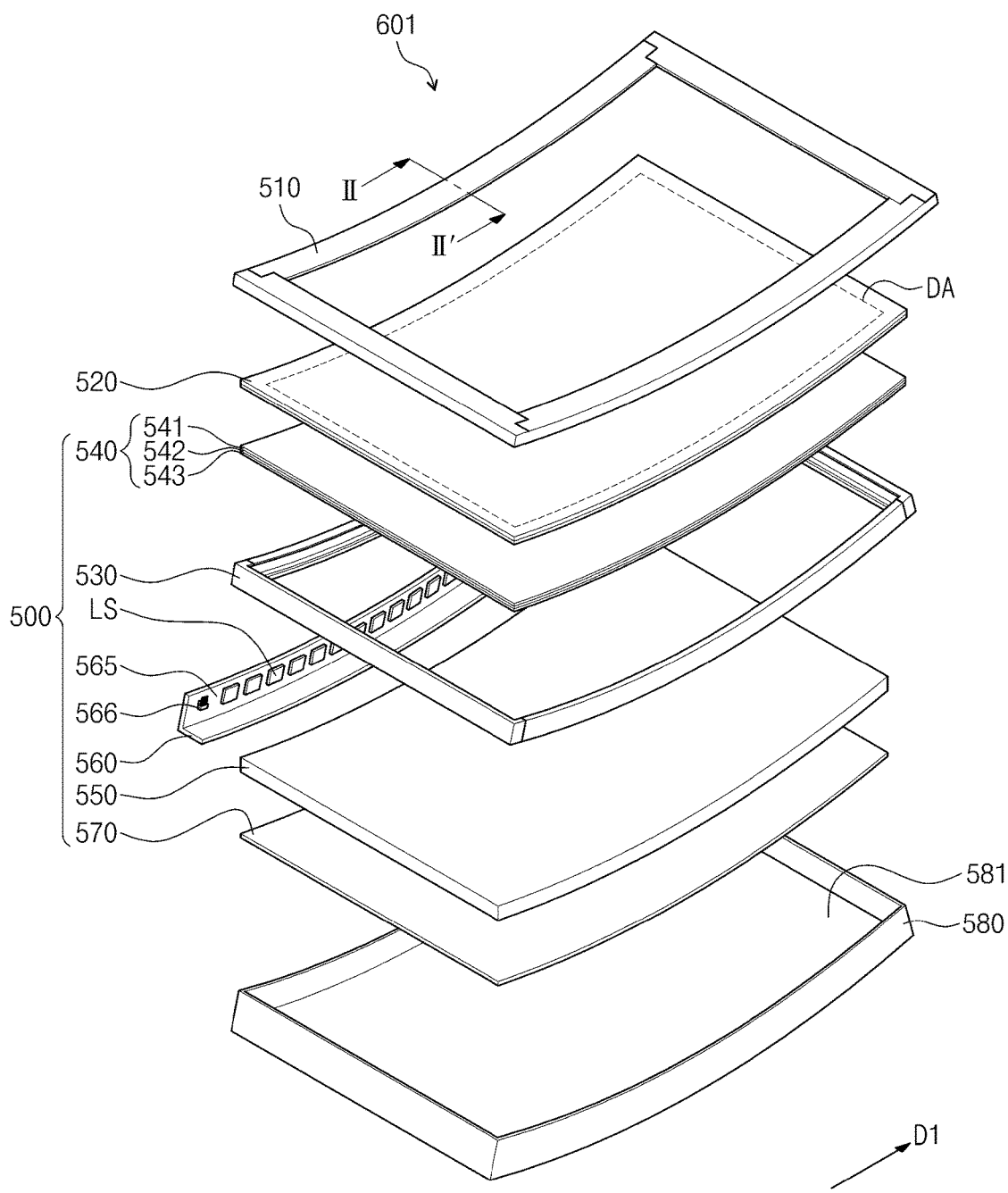
FIG. 4 is an exploded perspective view showing another exemplary embodiment of a curved display device according to the invention.
Figure 5:
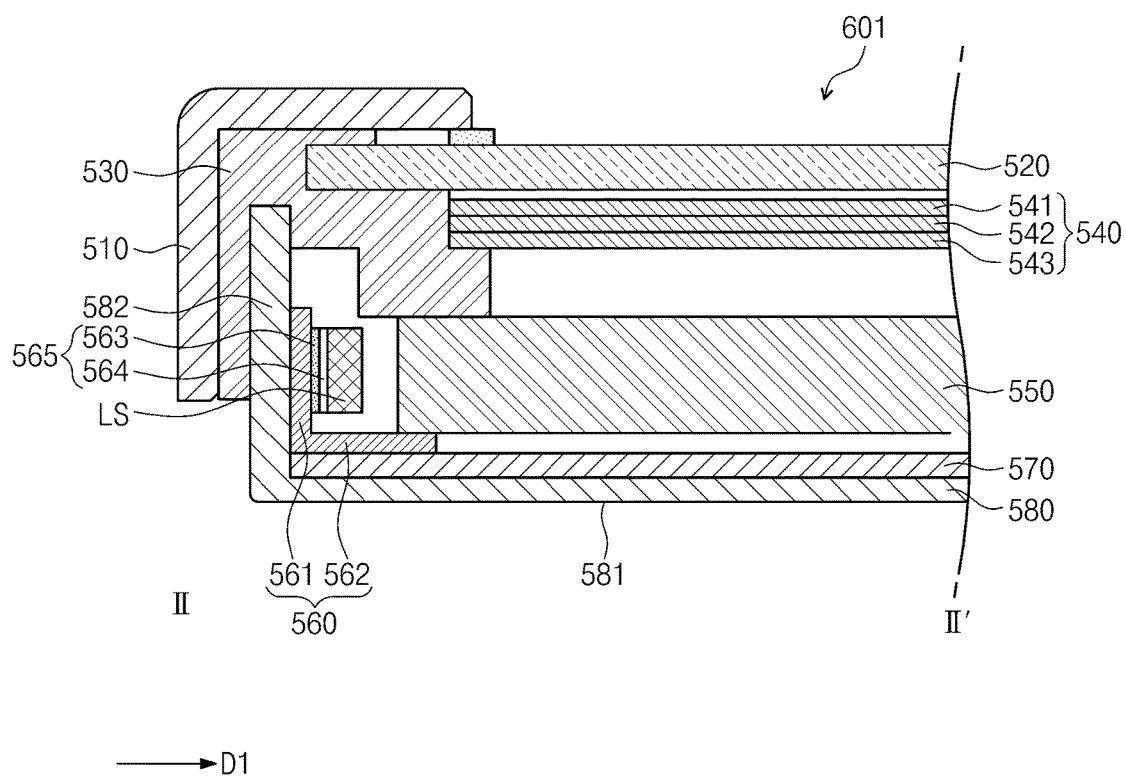
FIG. 5 is a cross-sectional view taken along line II-II' of FIG. 4.
Figure 6:
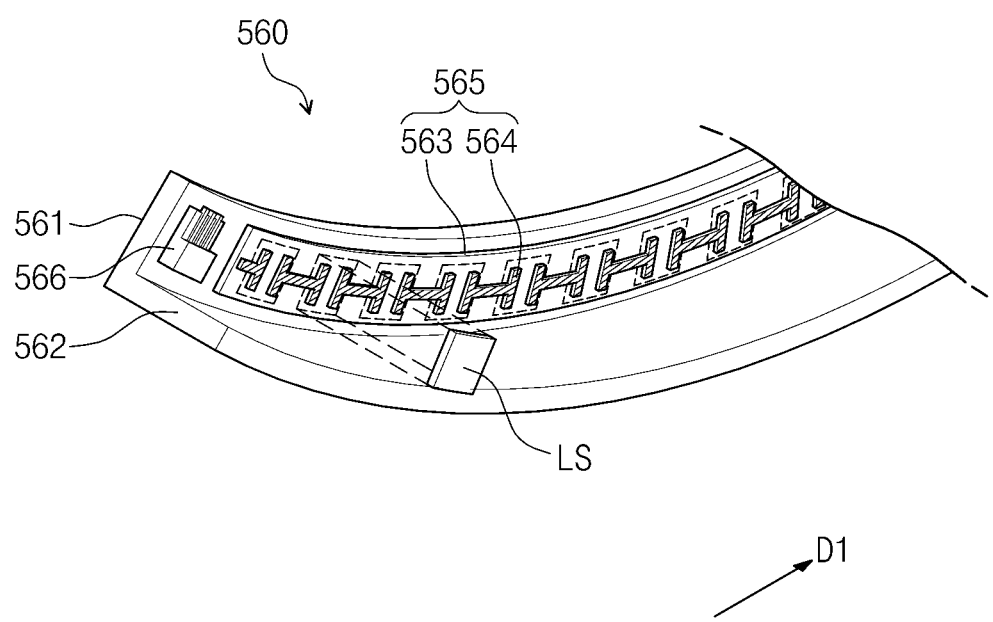
FIG. 6 is a perspective view showing an exemplary embodiment of a coupling state between light sources and a supporting member shown in FIG. 4.

Furthermore, since the film shape circuit pattern film 565 is attached to the curved sidewall 582 of the accommodating member 580, stress to the circuit pattern film 565 and components thereon such as the circuit pattern 564, caused by the curved shape of the sidewall 582, is reduced FIG. 4 is an exploded perspective view showing another exemplary embodiment of a curved display device 601 according to the invention, FIG. 5 is a cross-sectional view taken along line II-II' of FIG. 4, and FIG. 6 is a perspective view showing an exemplary embodiment of a coupling state between a light source and a supporting member shown in FIG. 4.

In FIGS. 4, 5 and 6, the same reference numerals denote the same elements in FIGS. 1, 2 and 3, and thus the detailed descriptions of the same elements will be omitted.

Referring to FIGS. 4, 5 and 6, the curved display device 601 is curved along a first direction D1 and has a curved shape. The curved display device 601 includes a display panel 520, a backlight unit 500, an accommodating member 580, a supporting member 560 and a covering member 510.

The supporting member 560 is curved along the first direction D1 and includes a first extending portion 561 and a second extending portion 562. Each of the first extending portion 561 and the second extending portion 562 may be curved along the first direction D1.

The supporting member 560 may define the first extending portion 561 thereof and the second extending portion 562 thereof. A length of the supporting member 560 is extended along the first direction D1. The first extending portion 561 may protrude towards the display panel 520 in a second direction inclined (e.g., perpendicular) to the first direction D1, and the second extending portion 562 may protrude towards the light guide plate 550 in a third direction inclined (e.g., perpendicular) to both the first direction D1 and the second direction.

In the exemplary embodiment, a circuit pattern film 565 is attached to the first extending portion 561 which extends from the second extending portion 562 in an extension direction thereof substantially perpendicular to an extension direction of the second extending portion 562. A plurality of light sources LS is coupled onto the circuit pattern film 565 attached to the first extending portion 561. Thus, the light sources LS are arranged on the first extending portion 561 of the supporting member 560 such that the circuit pattern 565 is interposed between the light sources LS and the first extending portion 561.

The first extending portion 561 contacts the accommodating member 580 at a first sidewall 582 of the accommodating member 580, and the second extending portion 562 is disposed on and supported by a reflection plate 570.

In addition, the circuit pattern film 565 includes an insulating layer 563 and a circuit pattern 564. The insulating layer 563 and the circuit pattern 564 are sequentially attached to the first extending portion 561 of the supporting member 560. Although not shown in figures, a conductive layer such as a copper thin film layer may be deposited on a rear surface of the light sources LS such that the light sources LS are connected to the circuit pattern 564. Further, a connector 566 is disposed on the first extending portion 561 of the supporting member 560 and is electrically connected to the circuit pattern 564 of the circuit pattern film 565.

According to the exemplary embodiment, since the circuit pattern film 565 is attached to the first extending portion 561 of the supporting member 560 which contacts the accommodating member 580 and is supported by the reflection plate 570, and since the light sources LS are arranged on the circuit pattern film 565 described above, a separate manufacturing procedure required to electrically connect the light sources LS to each other may be omitted.

Furthermore, since the film shape circuit pattern film 565 is attached to the curved supporting member 560, stress to the circuit pattern film 565 and components thereon such as the circuit pattern 564, caused by the curved shape of the supporting member 560, is reduced Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A curved display device comprising:
  a display panel which displays an image using a light, the display panel curved along a first direction;
  a backlight unit which generates and provides the light to the display panel;
  an accommodating member comprising a bottom portion and sidewalls which extend from the bottom portion to define a space in which the backlight unit is disposed; and
  a supporting member coupled to a sidewall among the sidewalls of the accommodating member, the supporting member curved along the first direction,
  wherein the backlight unit comprises:
    a plurality of light sources which generates and emits the light;
    a circuit pattern film which is attached to the supporting member; and
    a connector which is on the supporting member to which the circuit pattern film is attached and is electrically connected to the circuit pattern of the circuit pattern film,
  wherein the circuit pattern film comprises:
    a circuit pattern which electrically connects the light sources to each other, and
    an insulating layer which is directly on the supporting member and disposed between the circuit pattern and the supporting member.

2. The curved display device of claim 1, wherein the supporting member coupled to the sidewall among the sidewalls of the accommodating member comprises:
  a first extending portion of which a length thereof is curved along the first direction; and
  a second extending portion perpendicularly connected to the first extending portion and of which a length thereof is curved along the first direction,
  wherein the circuit pattern film is attached to the first extending portion of the supporting member to attach the circuit pattern film to the sidewall of the accommodating member to which the supporting member is coupled.

3. The curved display device of claim 2, wherein the connector is on the first extending portion to which the circuit pattern film is attached.

4. The curved display device of claim 2, wherein the insulating layer is directly on the first extending portion of the supporting member, the insulating layer between the circuit pattern and the sidewall of the accommodating member to which the supporting member is coupled.

5. The curved display device of claim 1, wherein the circuit pattern film is curved along the first direction.

6. The curved display device of claim 1, wherein the backlight unit further comprises:
- a light guide plate adjacent to the light sources, wherein the light guide plate guides the light emitted from the light sources to the display panel;
- an optical sheet between the light guide plate and the display panel; and
- a reflection plate facing the optical sheet to dispose the light guide plate between the optical sheet and the reflection plate and to dispose the supporting member between the optical sheet and the reflection plate,
- wherein long sides of each of the light guide plate, the optical sheet and the reflection plate are curved along the first direction.

\* \* \* \* \*